United States Patent
Cavalca et al.

(10) Patent No.: US 9,517,607 B2
(45) Date of Patent: Dec. 13, 2016

(54) SKINNED SUBSTRATES WITH HIGHLY CROSSLINKED POLYURETHANE LAYER

(71) Applicant: DOW GLOBAL TECHNOLOGIES LLC, Midland, MI (US)

(72) Inventors: Sara Cavalca, San Martino in Rio (IT); Sabrina Fregni, Nonantola (IT)

(73) Assignee: Dow Global Technologies LLC, Midland, MI (US)

( * ) Notice: Subject to any disclaimer, the term of this patent is extended or adjusted under 35 U.S.C. 154(b) by 107 days.

(21) Appl. No.: 14/410,090

(22) PCT Filed: Jun. 20, 2013

(86) PCT No.: PCT/US2013/046724
§ 371 (c)(1),
(2) Date: Dec. 21, 2014

(87) PCT Pub. No.: WO2014/004237
PCT Pub. Date: Jan. 3, 2014

(65) Prior Publication Data
US 2016/0016379 A1    Jan. 21, 2016

(30) Foreign Application Priority Data
Jun. 27, 2012   (IT) ............................... MI2012A1125

(51) Int. Cl.
| | | |
|---|---|---|
| *B32B 5/20* | (2006.01) | |
| *B32B 27/06* | (2006.01) | |
| *B32B 27/22* | (2006.01) | |
| *B32B 27/30* | (2006.01) | |
| *C08J 9/35* | (2006.01) | |
| *B29C 44/12* | (2006.01) | |
| *B32B 27/20* | (2006.01) | |
| *B32B 27/36* | (2006.01) | |
| *C08G 18/48* | (2006.01) | |
| *C08G 18/50* | (2006.01) | |
| *C08G 18/76* | (2006.01) | |
| *C08G 18/40* | (2006.01) | |
| *C08G 101/00* | (2006.01) | |
| *B29K 75/00* | (2006.01) | |
| *B29K 105/04* | (2006.01) | |
| *B29K 627/06* | (2006.01) | |

(52) U.S. Cl.
CPC ............. *B32B 5/20* (2013.01); *B29C 44/1233* (2013.01); *B32B 27/065* (2013.01); *B32B 27/20* (2013.01); *B32B 27/22* (2013.01); *B32B 27/302* (2013.01); *B32B 27/304* (2013.01); *B32B 27/306* (2013.01); *B32B 27/365* (2013.01); *C08G 18/4018* (2013.01); *C08G 18/482* (2013.01); *C08G 18/4816* (2013.01); *C08G 18/4833* (2013.01); *C08G 18/4841* (2013.01); *C08G 18/5021* (2013.01); *C08G 18/7664* (2013.01); *C08J 9/35* (2013.01); *B29K 2075/00* (2013.01); *B29K 2105/04* (2013.01); *B29K 2627/06* (2013.01); *B32B 2266/0278* (2013.01); *B32B 2270/00* (2013.01); *B32B 2307/71* (2013.01); *B32B 2307/734* (2013.01); *B32B 2605/003* (2013.01); *C08G 2101/0058* (2013.01); *C08J 2375/08* (2013.01)

(58) Field of Classification Search
CPC ............ C08G 18/4018; C08G 18/4816; C08G 18/482; C08G 18/4833; C08G 18/4841; C08G 18/5021; C08G 18/7664; C08G 2101/0058; C08J 2375/08; C08J 9/35; B32B 2266/0278; B32B 2270/00; B32B 2307/71; B32B 2307/734; B32B 2605/003; B32B 27/065; B32B 27/20; B32B 27/22; B32B 27/302; B32B 27/304; B32B 27/365; B32B 5/20; B29C 44/1233; B29K 2075/00; B29K 2105/04; B29K 2627/06
USPC ....................................... 428/424.6; 264/46.5
See application file for complete search history.

(56) References Cited

U.S. PATENT DOCUMENTS

| | | |
|---|---|---|
| 3,600,266 A | 8/1971 | Huntzinger |
| 3,714,077 A | 1/1973 | Cobbledick |
| 3,824,199 A * | 7/1974 | Nadeau et al. ................. 521/51 |
| 4,868,043 A | 9/1989 | Eling |
| 4,963,399 A | 10/1990 | Gill |
| 5,168,009 A | 12/1992 | Petrella |
| 5,300,531 A * | 4/1994 | Weaver .............. C08G 18/3825 427/373 |
| 5,334,448 A | 8/1994 | Horn |
| 5,774,674 A | 6/1998 | Cageao |
| 5,863,064 A * | 1/1999 | Rheinlander ....... B29C 37/0057 280/728.3 |
| 2006/0222838 A1 | 10/2006 | Allen |

FOREIGN PATENT DOCUMENTS

WO    2011/057999 A    5/2011

* cited by examiner

*Primary Examiner* — Thao T Tran
(74) *Attorney, Agent, or Firm* — Gary C. Cohn PLLC

(57) ABSTRACT

PVC-skinned composites include a substrate, a skin and an intermediate polyurethane layer. The polyurethane layer is characterized in having a low molecular weight between crosslinks, i.e., is somewhat highly crosslinked. The high level of crosslinking in the polyurethane leads to improved performance of the skin layer. The skin layer retains its original color upon aging, is less prone to shrinking and other loss of physical properties, and adheres better to the polyurethane layer.

12 Claims, No Drawings

SKINNED SUBSTRATES WITH HIGHLY CROSSLINKED POLYURETHANE LAYER

This invention relates to skinned composites that contain an intermediate polyurethane layer.

Certain automotive interior parts, such as instrument panels, are manufactured with an exterior, decorative skin backed with a layer of semi-flexible polyurethane foam. The skin material is quite often a plasticized poly(vinylchloride) (PVC). Plasticized PVC offers very significant advantages over other materials, when used as the skin material. Plasticized PVC produces a matte surface finish with superior grain retention at an acceptable cost. Plasticized PVC performs so well in these respects that it remains the material of choice despite its significant limitations.

Those limitations mainly have to do with the long-term performance of the material. Over time, plasticized PVC skins tend to shrink, discolor, lose flexibility and mechanical properties, and lose their adhesion to the underlying foam.

This loss of properties is generally associated with two phenomena, the degradation of the PVC and the loss of plasticizer over time. These may be related.

The degradation of PVC generally involves the loss of chlorine through a dehydrochlorination reaction. This introduces carbon-carbon double bonds into the PVC. Dehydrochlorination at one site along the PVC polymer chain renders adjacent sites more susceptible to dehydrochlorination. Because of this, the loss of chlorine and hydrogen, and the resulting double bond formation, tends to proceed along the PVC polymer chain, eventually producing a conjugated polyene structure. Polyene structures in two polymer chains can engage in a Diels-Alder condensation reaction, which introduces crosslinking.

The plasticizer can migrate from the exposed skin surface into the atmosphere, and also can migrate from the concealed surface into the polyurethane foam layer.

Both the degradation of the PVC and the migration of plasticization out of the skin are favored by heat and/or sunlight that, as a practical matter, cannot be avoided. To the contrary, recent trends in automobile design and styling are leading towards larger and flatter windshields, which let in more light than many earlier designs.

Other styling developments are placing still greater demands on the performance of the PVC skin. There is a trend towards using lighter colors. The lighter-colored materials are much more susceptible to color change as the PVC ages, tending to become darker, yellower and redder.

Another important trend is towards so-called "seamless" airbags. Airbags often are positioned under automotive interior trim components and burst through those components when deployed. The PVC skin is weakened, typically by scoring, around the airbag so the PVC material tears easily when the airbag is deployed and does not inhibit the full expansion of the bag. Originally, this scoring appeared on the exterior side of the skin, but more recent designs move the scoring to the interior side of the skin, so it is not visible. However, the score lines often become visible as the PVC ages. This is a significant aesthetic problem.

New grades of PVC resins were needed to accommodate the lighter colors and seamless airbag designs. The new resins tend to be lower in molecular weight and more heavily plasticized. The need for higher plasticization makes the long-term performance of the PVC skin even more dependent on the retention of the plasticizer.

Various strategies have been used to combat the problem of PVC degradation. Stabilizers of various kinds are routinely incorporated into the skin material. Other approaches have involved modifications to the underlying polyurethane foam. One proposed mechanism of PVC degradation is that amine catalyst residues present in the underlying polyurethane foam migrate into the skin layer, where they displace chlorine and in that way promote the dehydrochlorination reaction. This migration appears to correlate with increasing plasticizer level in the PVC. Accordingly, it has been attempted to reduce this amine migration through the use of metal polyurethane catalysts instead of the amine types, or by using so-called "reactive" amine catalysts which become bound into the polyurethane molecular structure.

None of these approaches has been entirely successful, even with earlier designs. The advent of lighter trim colors and seamless airbags has created yet a greater need to find a solution to the aging problem of PVC-skinned automotive trim components.

This invention is in one aspect a skinned composite comprising
  a) a substrate,
  b) an exterior plasticized polymeric skin covering at least a portion of the substrate; and
  c) a polyurethane layer interposed between the substrate and the plasticized polymeric skin, wherein the polyurethane layer is the reaction product of a reaction mixture that contains one or more polyisocyanates and one or more isocyanate-reactive compounds that contain two or more isocyanate-reactive groups, wherein the polyurethane has a calculated molecular weight per crosslink of no greater than 1250 as calculated by the formula $$MW_{xl} = \frac{A+B}{\frac{A(C-2)}{CD} + \frac{B(F-2)}{EFG} + \frac{B(F-1)\left(1-\frac{1}{E}\right)}{(E+1)G}}$$

wherein
A is the combined weight, in grams, of all isocyanate-reactive materials that contain at least 2 isocyanate-reactive groups/molecule (including any water) provided to the reaction mixture;
B is the combined weight, in grams, of all isocyanate compounds provided to the reaction mixture;
C is average functionality of all isocyanate-reactive compounds provided to the reaction mixture that contain at least 2 isocyanate-reactive groups/molecule (including any water);
D is the average equivalent weight in grams per hydroxyl group of all isocyanate-reactive compounds provided to the reaction mixture that contain at least 2 isocyanate-reactive groups/molecule (including any water);
E is the isocyanate index, calculated as the number of equivalents of isocyanate groups provided to the reaction mixture divided by the number of equivalents of isocyanate-reactive groups provided to the reaction mixture;
F is the average functionality of all isocyanate compounds provided to the reaction mixture; and
G is the average equivalent weight in grams per isocyanate group of all isocyanate compounds provided to the reaction mixture.

Applicants have found that the amount of crosslinking (as expressed by calculated molecular weight per crosslink) in the polyurethane layer plays has a very important affect on the aging characteristics of the plasticized polymeric skin. When the molecular weight per crosslink is 1250 or below, the skin performs better in several respects. It retains its original color better on accelerated aging tests. Adhesion to the polyurethane layer is often significantly improved after accelerated aging. The skin is less prone to shrinkage and other physical property loss over time. In addition, score lines on the underside of the skin (such as for so-called seamless airbag designs) tend to remain invisible longer than when the polyurethane has a greater molecular weight between crosslinks.

In specific embodiments, the invention is skinned composite comprising a) a substrate, b) an exterior plasticized polymeric skin covering at least a portion of the substrate; and c) a polyurethane layer interposed between the substrate and the plasticized polymeric skin, wherein the polyurethane layer is the reaction product of a reaction mixture that contains one or more polyisocyanates and one or more isocyanate-reactive compounds that contain two or more isocyanate-reactive groups, wherein the isocyanate index is from 0.9 to 1.25 and the isocyanate-reactive compounds that contain two or more isocyanate-reactive groups are selected from the group consisting of:

1) a blend of a high functionality polyol having a hydroxyl functionality of at least 4, and a hydroxyl equivalent weight of 80 to 250 with at least one low equivalent weight polyol, aminoalcohol or polyamine that has an equivalent weight per isocyanate group of up to about 125, more preferably up to 75, and a functionality of 3 to 4;

2) a blend of a high functionality polyol having a hydroxyl functionality of at least 4, and a hydroxyl equivalent weight of 80 to 250 with one or more high equivalent weight polyether polyols or polyether amines, the high equivalent weight polyol or polyether amine having a functionality of 2 to 3 and an equivalent weight of at least 350 to 2200;

3) a blend of a high functionality polyol having a hydroxyl functionality of at least 4, and a hydroxyl equivalent weight of 80 to 250 with at least one low equivalent weight polyol, aminoalcohol or polyamine that has an equivalent weight per isocyanate group of up to about 125, more preferably up to 75, and a functionality of 3 to 4 and one or more high equivalent weight polyols or polyether amines having a functionality of 2 to 3 and an equivalent weight of at least 350 to 2200;

4) a blend as in any of 1)-3), further including water; and 5) a blend as in any of 1)-4), further including one or more aliphatic polyesters having a hydroxyl functionality of at least 2.0 and a hydroxyl equivalent weight of about 350 to 1500 and which are a reaction product of an aliphatic dicarboxylic acid (or corresponding acid chloride or diester) with at least one polyol having at least 2 hydroxyl groups, a hydroxyl equivalent weight of 150 or less.

The invention is also a method for preparing the skinned composite of the invention, comprising positioning the skin and substrate within a mold to form a gap between the skin and substrate, introducing the reaction mixture into the mold between the skin and substrate and curing the reaction mixture in the mold between the skin and substrate.

The skinned composite includes an external layer of a plasticized polymer. The skin thickness is typically from 0.25 to 6 mm, more typically from 0.5 to 2 mm. The skin can be formed in any suitable manner, including various extrusion and casting methods, but a preferred method for making the skin is a dip molding or slush molding method. The skin can include various surface features such as grain or other surface texturing, such as to simulate the appearance of natural leather. In certain embodiments, the skin contains weakened areas such as score lines, which allow the skin to split along predetermined lines when subjected to certain applied forces, such as the deployment of an airbag. Such score lines may be present on the exposed and/or inner surface of the skin. However, the invention has particular advantages when the skin contains one or more score lines on its inner surface.

The plasticized skin includes at least one plasticized thermoplastic polymer. The thermoplastic polymer may be, for example, a polymer or copolymer of vinyl chloride; a polymer of copolymer of vinylidene chloride, a polyolefin such as polyethylene, polypropylene, a thermoplastic polyurethane and the like. Polymers and copolymers of vinyl chloride are preferred thermoplastic films.

The plasticizer is a solvent for the thermoplastic polymer, preferably one that has a boiling temperature of at least 150 C, more preferably at least 200 C, and which has a low vapor pressure at temperatures of 100 C and below. The plasticizer preferably has a molecular weight of at least 100, preferably at least 200, more preferably at least 250, and may have a molecular weight of as much as 4000, but more typically no greater than about 1500.

Among the suitable plasticizers are various carboxylic ester compounds such as bis(2-ethylhexyl) phthalate, diisononyl phthalate, bis(n-butyl) phthalate, butyl benzyl phthalate, diisodecyl phthalate, diethyl phthalate, diisobutyl phthalate, di-n-hexyl phthalate, trimethyl trimellitate, tri-(2-ethylhexyl)trimellitate, tri-(n-octyl,n-decyl)trimellitate, tri-(heptyl,nonyl)trimellitate, n-octyl trimellitate, bis(2-ethylhexyl)adipate, dimethyl adipate, monomethyl adipate, dioctyl adipate, dibutyl sebacate, dibutyl maleate, diisobutyl maleate, various benzoate esters, various vegetable oils and modified vegetable oils (such as epoxidized vegetable oils, various sulfonamides such as n-ethyl toluene sulfonamide, n-(2-hydroxypropyl)benzene sulfonamide, N-(n-butyl)benzene sulfonamide (DOA) and the like, various phosphate esters such as tricresyl phosphate and tributyl phosphate, glycol esters such as triethylene glycol dihexanoate and tetraethylene glycol diheptanoate and the like, polybutene polymers, various acetylated monoglycerides, alkyl citrates such as triethyl citrate, acetyl triethyl citrate, tributyl citrate, triocyl citrate, acetyl trioctyl citrate, acetyl trihexyl citrate, butyryl trihexyl citrate and the like; alkyl sulphonic acid phenyl ester, 1,2-cyclohexane dicarboxylate diesters such as 1,2-cyclohexane diisononyl ester, and the like.

The proportions of the thermoplastic polymer and the plasticizer in the skin layer are selected to provide the requisite physical properties (notably flexibility) to the skin. The plasticizer may constitute, for example, from 10 to 50% of the combined weight of the thermoplastic polymer and plasticizer. The invention is particularly suitable for use with skin materials having somewhat high levels of plasticizer such as, for example, from 20 to 50%, especially 25 to 45% by weight plasticizer, based on the combined weight of plasticizer and thermoplastic polymer.

An especially preferred skin layer is a polymer or copolymer of vinyl chloride that contains from 20 to 50%, especially 25 to 45% by weight plasticizer, based on the combined weight of plasticizer and thermoplastic polymer.

The skin may contain small amounts of other materials as may be useful. Among these are various colorants, which may be solid pigments and/or various types of dyes. The skin may contain one or more stabilizers, fillers, preservatives, biocides, UV blockers, flame retardants, and the like.

The polyurethane layer is interposed between the skin layer and the substrate. The polyurethane layer may have a thickness, for example, from as little as about 0.5 mm to 25 mm or more. A preferred thickness is 1 to 12 mm and a still more preferred thickness is 3 to 8 mm. The polyurethane layer may be cellular or non-cellular, and thus may have a bulk density of as little as about 24 kg/m³ to as much as about 1200 kg/m³. A useful density for many applications is from 48 to 480 kg/m³, especially from 80 to 320 kg/m³.

The polyurethane layer is a reaction product of a reaction mixture that contains one or more polyisocyanates and one or more isocyanate-reactive compounds that contain two or more isocyanate-reactive groups per molecule. The polyisocyanate(s), isocyanate-reactive compounds containing two or more reactive groups, and the ratio of isocyanate groups to isocyanate-reactive groups supplied by such isocyanate-reactive compounds (the "isocyanate index") are selected together such that the polyurethane has a calculated molecular weight per crosslink of no greater than 1250. The molecular weight per crosslink is a calculated value based on the functionalities and equivalent weights of these components of the reaction mixture, as well as the isocyanate index, according to the formula:

$$MW_{xl} = \frac{A+B}{\frac{A(C-2)}{CD} + \frac{B(F-2)}{EFG} + \frac{B(F-1)\left(1-\frac{1}{E}\right)}{(E+1)G}}$$

In this formula, A is the combined weight, in grams, of all isocyanate-reactive materials that contain at least 2 isocyanate-reactive groups/molecule, including any water as may be provided to the reaction mixture. Included among these isocyanate-reactive materials are all compounds that contain two or more hydroxyl, primary amino, secondary amino, epoxide, mercaptan and/or carboxylic acid groups. This includes all polyols, polyamines having two or more primary and/or secondary amine groups, and reactive amine catalysts that have at least two isocyanate-reactive groups. Water is treated as an isocyanate-reactive material whose weight is included within A, because it consumes two equivalents of isocyanate groups. The entire weight of all polyethers that have a nominal functionality of at least two isocyanate-reactive groups per molecule is included, even though such polyethers may contain some proportion of monofunctional impurities that form due to, for example, the isomerization of propylene oxide to form isopropenyl alcohol during the manufacture of such polyethers. By "nominal functionality", it is meant a number of isocyanate-reactive groups equal to the number of isocyanate-reactive groups per molecule of initiator compound used to prepare the polyether. The weight of isocyanate-reactive compounds that have only 1 isocyanate-reactive group per molecule is not included within A, except in the case noted above, in which monofunctional impurities are included within a polyether that has a nominal functionality of at least 2.

In the foregoing formula, B is the combined weight, in grams, of all isocyanate compounds provided to the reaction mixture;

In the foregoing formula, C is average functionality of all isocyanate-reactive compounds provided to the reaction mixture that contain at least 2 isocyanate-reactive groups/molecule (including any water). The average functionality is equal to the number of equivalents of isocyanate-reactive groups in the reaction mixture that are contributed by isocyanate-reactive compounds that contain at least 2 isocyanate-reactive groups per molecule, divided by the number of moles of such compounds.

In the foregoing formula, D is the average equivalent weight in grams per hydroxyl group of all isocyanate-reactive compounds provided to the reaction mixture that contain at least 2 isocyanate-reactive groups/molecule (including any water).

In the foregoing formula, E is the isocyanate index, calculated as the number of equivalents of isocyanate groups provided to the reaction mixture divided by the number of equivalents of isocyanate-reactive groups provided to the reaction mixture.

F is the average functionality of all isocyanate compounds provided to the reaction mixture (i.e., the number of equivalents of isocyanate groups provided to the reaction mixture by all compounds containing one or more isocyanate groups, divided by the number of moles of such isocyanate compounds).

G is the average equivalent weight in grams per isocyanate group of all isocyanate compounds provided to the reaction mixture.

The molecular weight between crosslinks preferably is at least 250 and more preferably at least 500. The molecular weight between crosslinks preferably is not greater than 1200. A particularly useful polyurethane layer has a molecular weight between crosslinks in the range of about 800 to 1200; this provides a semi-flexible polyurethane that has cushioning characteristics, especially when cellular, while providing the other advantages of the invention.

The aforementioned molecular weight per crosslink preferably is achieved with little or no isocyanurate formation. Accordingly, the isocyanate index preferably is not greater than 1.5 and more preferably is not greater than 1.25; and the reaction formulation is preferably substantially devoid of catalytic materials that strongly catalyze the trimerization of isocyanate groups to from isocyanurate groups. Examples of such strong trimerization catalysts include strong bases such as alkali metal salts and ammonium salts. A preferred minimum isocyanate index is 0.8, a more preferred isocyanate index is 0.95, and a still more preferred minimum isocyanate index is 1.0

Apart from isocyanurate formation, a lower molecular weight per crosslink is generally favored by (1) increasing the average functionality of the starting materials and (2) decreasing the average equivalent weight of the starting materials. Accordingly the reaction mixture preferably contains at least one isocyanate-reactive material that contains at least 4 isocyanate-reactive groups per molecule, at least one isocyanate compound that contains at least 4 isocyanate groups per molecule, or both. Similarly, the average equivalent weight of all isocyanate-reactive materials that contain at least 2 isocyanate-reactive groups preferably is no greater than about 1000 more preferably no greater than 750.

The isocyanate-reactive compounds in the reaction mixture preferably include one or more polyols, i.e., compounds containing two or more hydroxyl groups per molecule. A wide range of polyols are useful and the equivalent weights and functionalities of the individual polyols can vary quite widely, provided that those features are selected in combination with the other components and the isocyanate index to yield the necessary molecular weight between crosslinks as described above.

Examples of suitable polyols include hydroxy-functional acrylate polymers and copolymers, hydroxy-functional polybutadiene polymers, polyether polyols, polyester polyols, and various polyols that are based on vegetable oils or animal fats.

Polyether polyols include, for example, polymers of propylene oxide, ethylene oxide, 1,2-butylene oxide, tetramethylene oxide, block and/or random copolymers thereof, and the like. Of particular interest are poly(propylene oxide) homopolymers, random copolymers of propylene oxide and ethylene oxide in which the oxyethylene content is, for example, from about 1 to about 30% by weight, ethylene oxide-capped poly(propylene oxide) polymers which contain from 70 to 100% primary hydroxyl groups, and ethylene oxide-capped random copolymers of propylene oxide and ethylene oxide in which the oxyethylene content is from about 1 to about 30% by weight. The polyether polyols may contain low amounts of terminal unsaturation (for example, less than 0.02 meq/g or less than 0.01 meq/g), such as those made using so-called double metal cyanide (DMC) catalysts as described, for example, in U.S. Pat. Nos. 3,278,457, 3,278,458, 3,278,459, 3,404,109, 3,427,256, 3,427,334, 3,427,335, 5,470,813 and 5,627,120. Polymer polyols of various sorts may be used as well. Polymer polyols include dispersions of polymer particles, such as polyurea, polyurethane-urea, polystyrene, polyacrylonitrile and polystyrene-co-acrylonitrile polymer particles, in a polyol, typically a polyether polyol. Suitable polymer polyols are described in U.S. Pat. Nos. 4,581,418 and 4,574,137.

Polyester polyols include reaction products of polyols, preferably diols, with polycarboxylic acids or their anhydrides, preferably dicarboxylic acids or dicarboxylic acid anhydrides. The polycarboxylic acids or anhydrides may be aliphatic, cycloaliphatic, aromatic and/or heterocyclic and may be substituted, such as with halogen atoms. The polycarboxylic acids may be unsaturated. Examples of these polycarboxylic acids include succinic acid, adipic acid, terephthalic acid, isophthalic acid, trimellitic anhydride, phthalic anhydride, maleic acid, maleic acid anhydride and fumaric acid. The polyols used in making the polyester polyols preferably have an equivalent weight of 150 or less and include ethylene glycol, 1,2- and 1,3-propylene glycol, 1,4- and 2,3-butane diol, 1,6-hexane diol, 1,8-octane diol, neopentyl glycol, cyclohexane dimethanol, 2-methyl-1,3-propane diol, glycerin, trimethylol propane, 1,2,6-hexane triol, 1,2,4-butane triol, trimethylolethane, pentaerythritol, quinitol, mannitol, sorbitol, methyl glycoside, diethylene glycol, triethylene glycol, tetraethylene glycol, dipropylene glycol, dibutylene glycol and the like.

Aliphatic polyesters having a hydroxyl functionality of at least 2.0 and a hydroxyl equivalent weight of about 350 to 1500 are preferred. These aliphatic polyesters are preferably a reaction product of an aliphatic dicarboxylic acid (or corresponding acid chloride or diester) with at least one polyol having at least 2 hydroxyl groups and a hydroxyl equivalent weight of 150 or less, and are preferably branched due to the use of at least one tri- or higher functionality polyol and/or a diol having alkyl side groups (such as neopentyl glycol) as a starting material for the aliphatic polyester.

Useful hydroxyl-containing vegetable oils and/or animal fats include, for example, castor oil, hydroxymethyl group-containing polyols as described in WO 2004/096882 and WO 2004/096883, amide group-containing polyols as described in WO 2007/019063, hydroxyl ester-substituted fatty acid esters as described in WO 2007/019051, "blown" soybean oils as described in US Published Patent Applications 2002/0121328, 2002/0119321 and 2002/0090488, oligomerized vegetable oil or animal fat as described in WO 06/116456, hydroxyl-containing cellulose-lignin materials, hydroxyl-containing modified starches as well as the various types of renewable-resource polyols described in Ionescu, *Chemistry and Technology of Polyols for Polyurethanes*, Rapra Publishers 2005.

Other useful polyols include compounds having a hydroxyl equivalent weight of 30 to 125, such as ethylene glycol, diethylene glycol, triethylene glycol, 1,2-propylene glycol, 1,3-propylene glycol, 1,4-butane diol, 1,6-hexane diol, neopentyl glycol, dipropylene glycol, tripropylene glycol, cyclohexanedimethanol, triethanolamine, tri(isopropanol)amine, glycerin, trimethylol propane, trimethylol ethane, pentaerythritol, sucrose, sorbitol, and the like.

The isocyanate-reactive compounds in the reaction mixture may contain one or more aminoalcohols and/or one or more polyamines that contain two or more primary and/or secondary amino groups per molecule. By "aminoalcohol", it is meant a compound having at least one hydroxyl group and at least one primary or secondary amino group. Examples of these include alkanolamines such as diethanol amine, diisopropanol amine, monoethanol amine, monoisopropanolamine, alkoxylates of any of the foregoing, and the like. Suitable polyamines include, for example, amine-terminated polyethers, aromatic diamines such as toluene diamine, phenylene diamine, diphenylmethane diamine, bis(3-chloro-4-aminophenyl)methane and 2,4-diamino-3,5-diethyl toluene, and an aliphatic diamine such as ethylene diamine and the like.

Water is another useful isocyanate-reactive compound, and is a preferred ingredient of the reaction mixture in cases in which the polyurethane layer is cellular.

The reaction mixture preferably includes at least one high functionality polyol having a hydroxyl functionality of at least 4, more preferably at least 6. This polyol preferably has a hydroxyl equivalent weight of 80 to 500, more preferably 80 to 250. This high functionality polyol may be present as the sole isocyanate-reactive compound (other than water, when a cellular polyurethane is to be produced), but more typically this high functionality polyol will be present in admixture with one or more additional isocyanate-reactive compounds. Polyol blends of interest include, for example:

1) a blend of the high functionality polyol with at least one low equivalent weight polyol, aminoalcohol or polyamine that has an equivalent weight per isocyanate group of up to about 125, more preferably up to 75, and a functionality of 2-4, preferably 3-4. The low equivalent weight polyol may be, for example, glycerin, trimethylolpropane, trimethyolethane, triethanolamine or propoxylates thereof;

2) a blend of the high functionality polyol with one or more high equivalent weight polyether polyols or polyether amines, the high equivalent weight polyol or polyamine having a functionality of 2 to 3 and an equivalent weight of at least 250, more preferably at least 350, to 3000, preferably to 2200. This polyether is most preferably a polymer or copolymer of propylene oxide.

3) a blend of the high functionality polyol, a low equivalent weight polyol as described in 1) and a high equivalent weight polyol or polyamine as described in 2);

4) any of 1)-3), further including water; and 5) any of 1)-4), further including one or more aliphatic polyesters having a hydroxyl functionality of at least 2.3 and a hydroxyl equivalent weight of about 350 to 1500 and which are a reaction product of an aliphatic dicarboxylic acid (or corresponding acid chloride or diester) with at least one polyol having at least 3 hydroxyl groups and a hydroxyl equivalent weight of 150 or less, or a mixture of such a polyol with one or more diols having a hydroxyl equivalent weight of 150 or less.

In all of cases 1)-5), the high functionality polyol has a hydroxyl functionality of at least 4, more preferably at least 6 and has a hydroxyl equivalent weight of 80 to 500, more preferably 80 to 250.

The isocyanate-reactive compounds that have at least two isocyanate-reactive groups, together with any water that may be present (including, for example, any of blends a)-e) above), preferably have an average equivalent weight of no greater than 1000, more preferably no more than 350 and still more preferably no more than 200.

The organic isocyanate compound(s) contain an average of at least 1.5 and preferably at least 2.0 isocyanate groups per molecule. The polyisocyanate(s) may contain an average as many as 8 isocyanate groups per molecule, but typically contain no more than about 4 isocyanate groups per molecule on average. The organic polyisocyanate may have an isocyanate equivalent weight as little as about 85 and as much as about 2000. The functionality and isocyanate equivalent weight of the isocyanate compounds are in any event selected together with the isocyanate index and the equivalent and functionality of the isocyanate-reactive compounds (including any water as may present) such that the molecular weight between crosslinks is as described before.

The isocyanate groups may be bonded to aromatic, aliphatic or cycloaliphatic carbon atoms. Examples of suitable isocyanate compounds include m-phenylene diisocyanate, toluene-2,4-diisocyanate, toluene-2,6-diisocyanate, hexamethylene-1,6-diisocyanate, tetramethylene-1,4-diisocyanate, cyclohexane-1,4-diisocyanate, hexahydrotoluene diisocyanate, naphthylene-1,5-diisocyanate, methoxyphenyl-2,4-diisocyanate, diphenylmethane-4,4'-diisocyanate, diphenylmethane-2,4'-diisocyanate, diphenylmethane-2,2'-diisocyanate, 4,4'-biphenylene diisocyanate, 3,3'-dimethoxy-4,4'-biphenyl diisocyanate, 3,3'-dimethyl-4-4'-biphenyl diisocyanate, 3,3'-dimethyldiphenyl methane-4,4'-diisocyanate, 4,4',4"-triphenyl methane triisocyanate, a polymethylene polyphenylisocyanate (PMDI), toluene-2,4, 6-triisocyanate and 4,4'-dimethyldiphenylmethane-2,2',5,5'-tetraisocyanate. Preferably the polyisocyanate compound is diphenylmethane-4,4'-diisocyanate, diphenylmethane-2,4'-diisocyanate, PMDI, toluene-2,4-diisocyanate, toluene-2,6-diisocyanate or mixtures of any two or more thereof. Diphenylmethane-4,4'-diisocyanate, diphenylmethane-2,4'-diisocyanate and mixtures thereof are generically referred to as MDI, and all can be used. Toluene-2,4-diisocyanate, toluene-2,6-diisocyanate and mixtures thereof are generically referred to as TDI, and all can be used.

Any of the foregoing isocyanates can be modified to include urethane, urea, biuret, carbodiimide, allophanate, uretonimine, isocyanurate, amide or like linkages. Examples of modified isocyanates of these types include various urethane group and/or urea group-containing prepolymers, so-called "liquid MDI" products, and the like.

In addition to the foregoing components, the reaction mixture may contain one or more catalysts for the reaction of isocyanate groups towards isocyanate-reactive groups. Among the useful catalysts include various tertiary amine compounds, various tin compound and other metal polyurethane catalysts, including those described, for example, in U.S. Pat. No. 4,390,645. A preferred type of catalyst is a so-called "reactive" amine catalyst that contains at least one tertiary amino group and at least one isocyanate-reactive group, typically a hydroxyl, primary amino or secondary amino group. Catalysts of this type react into the polymer structure as the reaction mixture cures. Examples of reactive amine catalysts include 2-propanol,1,1'-[[3-(dimethylamino)propyl]imino]bis-, 1,3-propanediamine, N-1-[2-[2[(dimethylamino)ethoxy]ethyl]-N-1-methyl, ethanol,2-[[2-[2-(dimethylamino)ethoxy]ethyl]methylamino, and 1,3-propanediamine,N-3-[3-(dimethylamino)propyl]-N-1,N-1-dimethyl, and the like.

The reaction mixture may contain one or more surfactants (particularly if the polyurethane is to be cellular). Examples of suitable surfactants include alkali metal and amine salts of fatty acids; alkali metal and amine salts of sulfonic acids; siloxane-oxyalkylene polymers or copolymers and other organopolysiloxanes; oxyethylated alkylphenols; oxyethylated fatty alcohols such as Tergitol 15-S-9, from The Dow Chemical Company; paraffin oils; ricinoleic acid esters; turkey red oil; peanut oil; paraffins; fatty alcohols; dimethyl polysiloxanes and oligomeric acrylates with polyoxyalkylene and fluoroalkane side groups. These surfactants are generally used in amounts of 0.01 to 2 parts by weight based on 100 parts by weight of the polyols. Organosilicone surfactants are generally preferred types.

The reaction mixture may in addition contain other optional ingredients such as, for example, one or more physical blowing agents, one or more fillers, one or more colorants, one or more reinforcing agents, antioxidants, UV absorbers, flame retardants, biocides, and the like.

The substrate can be made of a wide variety of substances, such as an engineering thermoplastic or thermoset resin, wood, metal, ceramic, or other material that meets the requirements of the intended use for the composite. The substrate needs to be able to withstand the conditions of the polyurethane-forming reaction. The function of the substrate in most cases is to provide rigidity, fix the general dimensions and shape of the composite, and provide for points of attachment to other members or auxiliaries.

The composite is made by forming a layer of the polyurethane-forming reaction mixture between the substrate and the skin layer, and then curing the reaction mixture to form a polyurethane layer intermediate to substrate and skin and adhering to both. It is often convenient to perform this operation in a mold. For example, the skin can be positioned into one mold half, and a layer of the polyurethane reaction mixture introduced onto the skin. The substrate is positioned in the mold, leaving a gap between the substrate and the skin corresponding to the desired thickness of the cured polyurethane, and the polyurethane is then cured in the mold between the skin and substrate. The polyurethane-forming reaction is exothermic, therefore it may not be necessary to apply heat to promote the cure, although it is within the scope of invention to do so. The temperature should not be allowed to exceed the melting temperature of the skin, and should not be so high that the substrate melts, degrades or becomes distorted. Curing in the mold is continued until an adhesive bond is formed between skin, polyurethane layer and substrate, which bond is strong enough to allow the composite to be demolded without permanent damage.

Surprisingly, the composition of the polyurethane layer has been found to have a strong effect on the performance of the skin layer of the composite. When the polyurethane layer has a molecular weight between crosslinks of 1250 or less, the skin layer performs better in several respects, including color retention, adhesion to the underlying polyurethane layer, dimensional stability and/or physical properties, over time and after exposure to moderately elevated temperatures. This effect has been found to be independent on the foam structure of the polyurethane layer; the benefits are seen when the polyurethane layer is open-celled or closed-celled, and significant improvements are seen even when the polyurethane layer is non-cellular.

The superior performance of the skin layer can be evaluated through an accelerated aging test, such as described in the following examples. On this accelerated aging test, composites of the invention are typically seen to exhibit discolorations ($\Delta E$ values on the CIELAB color grid) of 3 or less, and often 2 or less, although the $\Delta E$ values will depend to some extent on the color of the skin and the particular materials used to color the skin. Adhesive strengths after aging are often increased by 50% or more. In addition, the skin layer often exhibits little or no dimensional change after exposure to these aging conditions. Interior score lines are more apt to remain invisible or at most scarcely visible after this aging.

Composites of the invention are useful in a wide range of vehicular and construction applications. Because the skin layer is primarily decorative in function, the composites are especially useful as trim or decorative members. In vehicular applications, composites of the invention can be used, for example, as instrument panels; interior door panels; rear window shelves, steering wheels, console covers, and the like.

The following examples are provided to illustrate the invention but are not intended to limit the scope thereof. All parts and percentages are by weight unless otherwise indicated.

Example 1 and Comparative Sample A

Three layer composite Example 1 is prepared as follows. The substrate is a black polycarbonate/ABS resin panel having a thickness of about 17 mm. The skin is a layer of a colored and plasticized PVC. This skin material is a light gray color, high ductility PVC skin designed for seamless airbag instrument panel systems. The composites also include a polyurethane layer, 5-6 mm in thickness, to bring the total composite thickness to 1 cm.

The composites are formed by placing the skin in the bottom half of a mold, placing the substrate in the top half of the mold. A polyurethane-forming composition is then injected into the mold using a high pressure foaming machine, between skin and substrate, and cured to form an intermediate layer bonded to both skin and substrate. Component temperatures are 25° C., mold temperature is 50° C., demold time is 180 seconds. Foam density is approximately 140 g/liter. The foam formulation (polyol and isocyanate components) is as set forth in Table 1 below. The polyol and isocyanate components are mixed at ratios which provide a 1.05 isocyanate index. The calculated molecular weight per cross-link for this material is about 1150.

Comparative Sample A is made in the same manner, using a different polyurethane foam formulation (as shown in Table 1), again at a 1.05 index, which provides a calculated molecular weight per crosslink of about 1500.

TABLE 1

| | Parts by Weight | |
|---|---|---|
| Ingredient | Ex. 1 | Comp. Sample A |
| Polyol Component | | |
| 1626 equivalent weight, nominally trifunctional ethylene oxide-capped poly(propylene oxide) | 0 | 86.9 |
| 2040 equivalent weight, nominally trifunctional ethylene oxide-capped poly(propylene oxide) | 40 | 0 |
| 1902 equivalent weight, nominally trifunctional ethylene oxide-capped poly(propylene oxide) | 41.2 | 0 |

TABLE 1-continued

| | Parts by Weight | |
|---|---|---|
| Ingredient | Ex. 1 | Comp. Sample A |
| 1675 equivalent weight, nominally trifunctional high-ethylene oxide polyol | 2 | 2 |
| 200 equivalent weight, sucrose-glycerin initiated propylene oxide/ethylene oxide random copolymer | 10 | 0 |
| 88 equivalent weight, ethylene diamine-initiated poly(propylene oxide) | 0 | 5 |
| 2100 molecular weight, 2.5 functional adipic acid polyester polyol | 2 | 2 |
| Reactive amine catalyst mixture | 1.1 | 1.1 |
| Silicone surfactant | 0.5 | 0.5 |
| Glycerin | 0.5 | 0.5 |
| Antioxidant | 0.2 | 0 |
| Water | 2.5 | 2.5 |
| Polyisocyanate Component | | |
| Mixture of uretonimine-modified MDI, polymeric MDI and MDI prepolymer, isocyanate equivalent weight 147 and isocyanate functionality 2.64. | To 105 index | |
| Mixture of uretonimine-modified MDI, polymeric MDI and MDI prepolymer, isocyanate equivalent weight 140 and isocyanate functionality 2.4. | | To 105 index |

Three duplicate 6 cm×6 cm×6 cm samples are prepared from the cured Example 1 composite. These samples are separately placed into closed jars and heated for 8 days at 120° C. The CIELAB L*, a* and b* color coordinates of the skin are measured before and after aging, using a Minolta Chroma Meter CR 300 colorimeter. The discoloration ($\Delta E^*$ value) is calculated as $$\Delta E^* = \sqrt{\Delta L^{*2} + \Delta a^{*2} + \Delta b^{*2}}$$

where $\Delta L^* = L^* - L^{*\prime}$, in which $L^*$ represents the CIELAB $L^*$ value before aging and $L^{*\prime}$ represents the CIELAB $L^*$ value after aging; $\Delta a^* = a^* - a^{*\prime}$, in which $a^*$ represents the CIELAB $a^*$ value before aging and $a^{*\prime}$ represents the CIELAB $a^*$ value after aging; and $\Delta b = b^* - b^{*\prime}$, in which $b^*$ represents the CIELAB $b^*$ value before aging and $b^{*\prime}$ represents the CIELAB $b^*$ value after aging.

Additional unaged samples of the Example 1 composite are evaluated for adhesion strength (skin to polyurethane layer) according to the PV2034 peeling method.

Other samples of the Example 1 composite are evaluated for cracking and weakening line visibility as follows. A square cut is made through the skin of the composite without damaging the underlying polyurethane foam. The cut is made using a thin blade such that, before aging, the cut lines are barely visible. The sample is then aged in a closed jar for 8 days at 120° C., and the skin is visually examined for shrinkage and deformation of the skin.

The discoloration, adhesive strength and cracking/weakening line visibility are evaluated for the Comparative A Samples in the same way.

These experiments are then repeated, this time using a light beige color, high ductility PVC skin.

Results of this testing are as indicated in Table 2.

TABLE 2

| Test | Ex. 1 | Comp. Sample A* |
|---|---|---|
| Polyurethane calculated molecular weight between crosslinks | 1150 | 1500 |
| Gray PVC skin | | |
| Discoloration ($\Delta E$) | 1.0 ± 0.2 | 2.3 ± 0.8 |
| Adhesion Strength (N/5 cm) | 30 ± 1 | 16 ± 3 |

TABLE 2-continued

| Test | Ex. 1 | Comp. Sample A* |
|---|---|---|
| Cracking/Weakening line visibility | No shrinkage or deformation at cut line; the appearance of the cuts are virtually unchanged during the aging process. | Visible shrinkage and deformation at cut line |

Beige PVC skin

| | | |
|---|---|---|
| Discoloration (ΔE) | 2.7 ± 0.1 | 5.4 ± 1.5 |
| Adhesion Strength (N/5 cm) | 26 ± 1 | 12 ± 1 |
| Cracking/Weakening line visibility | No shrinkage or deformation at cut line; the appearance of the cuts are virtually unchanged during the aging process. | Visible shrinkage and deformation at cut lines |

As the data in Table 2 indicates, discoloration is reduced by half or more, adhesion strength is approximately doubled, and dimensional stability of the skin layer is very significantly improved when the molecular weight between crosslinks is reduced from 1500 to 1150.

Examples 2-3 and Comparative Sample B

Composite Examples 2-3 and Comparative Sample B are made and tested in the same general manner as described with respect to Example 1. The polyurethane reaction mixture in each case is as described in Table 3; results are as indicated in Table 4.

TABLE 3

| | Parts by Weight | | |
|---|---|---|---|
| Ingredient | Comp. Sample B | Ex. 2 | Ex. 3 |
| Polyol Component | | | |
| 1902 equivalent weight, nominally trifunctional ethylene oxide-capped poly(propylene oxide) | 89.05 | 0 | 0 |
| 1626 equivalent weight, nominally trifunctional ethylene oxide-capped poly(propylene oxide) | 0 | 4 | 0 |
| 117 equivalent weight sorbitol initiated poly(propylene oxide) | 0 | 85.05 | 89.05 |
| 1675 equivalent weight, nominally trifunctional high-ethylene oxide polyol | 2 | 2 | 2 |
| 88 equivalent weight, ethylene diamine-initiated poly(propylene oxide) | 5 | 5 | 5 |
| 1000 equivalent weight, difunctional polyester polyol | 2 | 2 | 2 |
| Reactive amine catalyst mixture | 0.95 | 0.95 | 0.95 |
| Silicone surfactant | 0.5 | 0.5 | 0.5 |
| Glycerin | 0.5 | 0.5 | 0.5 |
| Polyisocyanate Component | | | |
| Polymeric MDI, isocyanate content 34% by weight | To 105 index | To 105 index | To 105 index |

These formulations lack a blowing agent and therefore form compact polyurethane layers having densities in excess of 750 kg/m$^3$.

TABLE 4

| Test | Comp. Sample B* | Example 2 | Example 3 |
|---|---|---|---|
| Polyurethane calculated molecular weight between crosslinks | 1500 | 355 | 286 |
| Beige PVC skin | | | |
| Discoloration (ΔE) | 8.8 ± 0.0 | 2.9 ± 0.6 | 1.7 ± 0.8 |
| Cracking/Weakening line visibility | Visible shrinkage and deformation at cut line | No shrinkage or deformation at cut line; the appearance of the cuts are virtually unchanged during the aging process. | No shrinkage or deformation at cut line; the appearance of the cuts are virtually unchanged during the aging process. |

TABLE 4-continued

| Test | Comp. Sample B* | Example 2 | Example 3 |
|---|---|---|---|
| | Gray PVC skin | | |
| Discoloration (ΔE) | 15.5 ± 7.8 | 2.2 ± 0.3 | 2.0 ± 0.3 |
| Cracking/Weakening line visibility | Visible shrinkage and deformation at cut lines | No shrinkage or deformation at cut line; the appearance of the cuts are virtually unchanged during the aging process. | No shrinkage or deformation at cut line; the appearance of the cuts are virtually unchanged during the aging process. |

As before, very substantial reductions in discoloration are seen, and a large improvement in dimensional stability is seen.

What is claimed is:

1. A skinned composite comprising
a) a substrate,
b) an exterior plasticized polymeric skin having a thickness of 0.5 to 2 mm covering at least a portion of the substrate, the exterior plasticized polymer skin comprising a thermoplastic polymer and 25 to 45% by weight of a plasticizer based on the combined weight of the plasticizer and the thermoplastic polymer and further having one or more score lines on an exposed and/or an inner surface; and
c) a polyurethane layer interposed between the substrate and the plasticized polymeric skin, wherein the polyurethane layer is the reaction product of a reaction mixture that contains one or more polyisocyanates and one or more isocyanate-reactive compounds that contain two or more isocyanate-reactive groups, wherein the polyurethane has a calculated molecular weight per crosslink of no greater than 1250 as calculated by the formula $$MW_{xl} = \frac{A+B}{\frac{A(C-2)}{CD} + \frac{B(F-2)}{EFG} + \frac{B(F-1)\left(1-\frac{1}{E}\right)}{(E+1)G}}$$

wherein
A is the combined weight, in grams, of all isocyanate-reactive materials that contain at least 2 isocyanate-reactive groups/molecule, including any water, provided to the reaction mixture;
B is the combined weight, in grams, of all isocyanate compounds provided to the reaction mixture;
C is average functionality of all isocyanate-reactive compounds provided to the reaction mixture that contain at least 2 isocyanate-reactive groups/molecule, including any water;
D is the average equivalent weight in grams per hydroxyl group of all isocyanate-reactive compounds provided to the reaction mixture that contain at least 2 isocyanate-reactive groups/molecule, including any water;
E is the isocyanate index, calculated as the number of equivalents of isocyanate groups provided to the reaction mixture divided by the number of equivalents of isocyanate-reactive groups provided to the reaction mixture;
F is the average functionality of all isocyanate compounds provided to the reaction mixture; and
G is the average equivalent weight in grams per isocyanate group of all isocyanate compounds provided to the reaction mixture.

2. The skinned composite of claim 1 wherein the skin is a plasticized polymer of vinyl chloride.

3. The skinned composite of claim 1, wherein the density of the polyurethane layer is from 48 to 480 kg/m³.

4. The skinned composite of claim 1 wherein the polyisocyanate(s) have an average functionality of at least 2.0 and an isocyanate equivalent weight of 85-200.

5. The skinned composite of claim 1 which exhibits a discoloration, after heating for 8 days at 120° C., characterized by a ΔE* value of 3 or less.

6. A method for preparing the skinned composite of claim 1, comprising positioning the skin and the substrate within a mold to form a gap between the skin and the substrate, introducing the reaction mixture into the mold between the skin and the substrate and curing the reaction mixture in the mold between the skin and substrate.

7. A skinned composite comprising
a) a substrate,
b) an exterior plasticized polymeric skin having a thickness of 0.5 to 2 mm covering at least a portion of the substrate, the exterior plasticized polymer skin comprising a thermoplastic polymer and 25 to 45% by weight of a plasticizer based on the combined weight of the plasticizer and the thermoplastic polymer, and further having one or more score lines on an exposed and/or an inner surface; and
c) a polyurethane layer interposed between the substrate and the plasticized polymeric skin, wherein the polyurethane layer is the reaction product of a reaction mixture that contains one or more polyisocyanates and one or more isocyanate-reactive compounds that contain two or more isocyanate-reactive groups, wherein the reaction mixture has an isocyanate index of from 0.9 to 1.25 and the isocyanate-reactive compounds that contain two or more isocyanate-reactive groups are selected from the group consisting of:
1) a blend of a high functionality polyol having a hydroxyl functionality of at least 4, and a hydroxyl equivalent weight of 80 to 250 with at least one low equivalent weight polyol, aminoalcohol or polyamine that has an equivalent weight per isocyanate group of up to about 125, and a functionality of 3 to 4;
2) a blend of a high functionality polyol having a hydroxyl functionality of at least 4, and a hydroxyl equivalent weight of 80 to 250 with one or more high equivalent weight polyether polyols or polyether amines, the high equivalent weight polyol or polyether amine having a functionality of 2 to 3 and an equivalent weight of at least 350 to 2200;

3) a blend of a high functionality polyol having a hydroxyl functionality of at least 4, and a hydroxyl equivalent weight of 80 to 250 with at least one low equivalent weight polyol, aminoalcohol or polyamine that has an equivalent weight per isocyanate group of up to about 125and a functionality of 3 to 4 and one or more high equivalent weight polyols or polyether amines having a functionality of 2 to 3 and an equivalent weight of at least 350 to 2200;
4) a blend as in any of 1)-3), further including water; and
5) a blend as in any of 1)-4), further including one or more aliphatic polyesters having a hydroxyl functionality of at least 2 and a hydroxyl equivalent weight of about 350 to 1500 and which are a reaction product of an aliphatic dicarboxylic acid (or corresponding acid chloride or diester) with at least one polyol having at least 2 hydroxyl groups and a hydroxyl equivalent weight of 150 or less, or a mixture of such a polyol with one or more diols having a hydroxyl equivalent weight of 150 or less.

8. The skinned composite of claim 7 wherein the skin is a plasticized polymer of vinyl chloride.

9. The skinned composite of claim 7, wherein the density of the polyurethane layer is from 48 to 480 kg/m$^3$.

10. The skinned composite of claim 7 wherein the polyisocyanate(s) have an average functionality of at least 2.0 and an isocyanate equivalent weight of 85-200.

11. The skinned composite of claim 7 which exhibits a discoloration, after heating for 8 days at 120° C., characterized by a $\Delta E^*$ value of 3 or less.

12. A method for preparing the skinned composite of claim 7, comprising positioning the skin and the substrate within a mold to form a gap between the the skin and the substrate, introducing the reaction mixture into the mold between the skin and the substrate and curing the reaction mixture in the mold between the skin and the substrate.

* * * * *